(12) United States Patent
Jard

(10) Patent No.: US 7,225,668 B2
(45) Date of Patent: Jun. 5, 2007

(54) WHEEL-MOUNTED TIRE PRESSURE GAUGE

(76) Inventor: James E. Jard, 508 W. Holly Rd., Virginia Beach, VA (US) 23454

( * ) Notice: Subject to any disclaimer, the term of this patent is extended or adjusted under 35 U.S.C. 154(b) by 0 days.

(21) Appl. No.: 11/335,212

(22) Filed: Jan. 19, 2006

(65) Prior Publication Data

US 2006/0162437 A1    Jul. 27, 2006

Related U.S. Application Data

(60) Provisional application No. 60/645,373, filed on Jan. 21, 2005.

(51) Int. Cl.
B60C 23/02    (2006.01)
(52) U.S. Cl. ..................... 73/146.8; 340/442
(58) Field of Classification Search ................ 73/146, 73/146.8; 340/442
See application file for complete search history.

(56) References Cited

U.S. PATENT DOCUMENTS

| | | | | |
|---|---|---|---|---|
| 4,353,322 A | * | 10/1982 | Weglin et al. | 116/34 B |
| 4,384,482 A | * | 5/1983 | Snyder | 73/146.5 |
| 4,646,673 A | * | 3/1987 | Fordyce | 116/34 R |
| 4,924,697 A | * | 5/1990 | Hunt et al. | 73/146.8 |
| 4,953,395 A | | 9/1990 | Jard | |
| 5,770,797 A | | 6/1998 | Lapohn | |
| 6,782,740 B2 | | 8/2004 | Wallach | |
| 6,832,573 B2 | * | 12/2004 | Evans et al. | 116/34 R |
| 2002/0139288 A1 | * | 10/2002 | Evans et al. | 116/34 R |

* cited by examiner

*Primary Examiner*—Andre Allen

(57) ABSTRACT

Tire pressure-indicating gauge is mounted at the center of a spoked wheel for a pneumatic tire to continuously monitor and display the tire's air pressure. The pneumatic tire is mounted on the rim of wheel, and pressurized air may be selectively introduced to, and captured within, the pneumatic tire via a common rim-mounted valve stem. Air pressure within the pneumatic tire is communicated to the pressure-indicating gauge via a hollow channel disposed within one of the spokes of the wheel, on the opposite side of the wheel from the valve stem. The pressure-indicating gauge is secured within a recess in the hub of the wheel in an air-tight fashion. The hollow air channel is preferably molded or cast into a spoke in such a manner that there is little or no outwardly visible physical difference between the various spokes of the wheel.

10 Claims, 5 Drawing Sheets

WHEEL-MOUNTED TIRE PRESSURE GAUGE

CROSS REFERENCE TO RELATED APPLICATIONS

This application claims priority of U.S. Provisional Patent Application No. 60/645,373 filed Jan. 21, 2005 entitled "Wheel-Mounted Tire Pressure Gauge".

FIELD OF INVENTION

The present invention relates to tire pressure indicating gauges, particularly to tire pressure gauges adapted to be permanently or semi-permanently mounted at the hub of a wheel.

BACKGROUND OF PRIOR ART

It is well known that improper automobile tire inflation causes accelerated and uneven tire wear, and increases the risk of tire blow outs which, in turn, presents a traffic safety hazard. Such problems can often be eliminated by monitoring of the tire's pressure and, accordingly, by inflating the tire to the proper pressure.

Many prior methods and apparatus for measuring automobile tire pressure are known. Such prior devices are generally of three types, namely: (1) a detached pressure gauge which may be temporarily connected to the valve stem of a non-moving tire for purposes of reading tire's pressure; (2) a remote-reading gauge system that has a pressure sensing device that constantly senses tire pressure in communication with a remote indicator (typically in the automobile's dashboard), which allows either constant or intermittent tire pressure monitoring from inside the automobile; and (3) a tire pressure gauge or indicator permanently attached to the tire's valve stem by which the tire pressure can be read directly when the tire is not moving.

Of the third type, prior pressure gauges that are arranged in permanent communication with a tire's valve stem typically either have the indicator component mounted at or near the valve stem, itself, or have the indicator component located at or near the center of the wheel. In the latter instance, there is typically a pneumatic conduit running between the valve stem and the indicator component.

There are several problems with prior devices in which the indicator component is mounted at the valve stem or near the valve stem (for example, mounted on the rim of the wheel). Such devices are inherently unbalanced, since there is typically nothing counterbalancing the eccentric weight of the off-center indicator component. In addition, because these prior devices are off-center (relative to the tire's and the automobile's axle), they must be designed to endure high centrifugal forces which may be encountered when the automobile moves and the wheel turns. Such high forces can be destructive to the device as well as to the automobile. In addition, in the event the device becomes detached from the valve stem while the automobile is in motion, the device may become a high velocity projectile and thus present a safety hazard. Additionally, because of the eccentricity of the load that these devices add to the tire, the automobile's tire may become unbalanced, thus presenting a safety problem and causing an uneven tire wear and an unsafe ride for the automobile's passengers. Also, in order to minimize the effects of the large eccentric load, such prior devices are typically designed to be very small—often too small for the gauge itself to be easily read by an operator.

In order to overcome some of the problems caused by eccentric loading of stem-mounted or wheel rim-mounted air pressure gauges, some prior devices have been designed having the pressure indicator component mounted at the center of the wheel, typically on the hub. In such prior devices a pneumatic conduit typically is removeably attached at one end to the tire's valve stem; and the other end is permanently attached to the pressure indicating gauge component. U.S. Pat. No. 4,953,395 is an example of this type of wheel-mounted pressure gauge.

Although such prior devices offer advantages over valve stem-mounted and wheel rim-mounted pressure gauges, such prior devices are still often unbalanced, owing principally to the eccentric load of the valve stem, itself and the conduit attached to it.

Another problem of such prior hub-mounted pressure gauges is that attachment of the gauge member is typically accomplished by the addition of bolts and nuts, which can add cost, weight and eccentric loads to the wheel system.

Another problem of such prior devices is that, in order to add air to the tire, either the conduit needs to be removed from the valve stem or, alternatively, the valve stem needs to be fitted with a special supplemental valve port.

OBJECTS

Accordingly, the primary object of the present invention is to provide a tire pressure sensing and indicating device by which the pressure of an automobile tire can be read.

Another object of the present invention is to provide a device of the character described in which a tire pressure sensing gauge is attached to the center of an automobile wheel in such a manner that the gauge may be easily read by an operator when the wheel is not moving.

Another object of the present invention is to provide a device of the character described in which the tire pressure sensing and indicating device may remain attached to the wheel of the tire while the tire is in motion.

Another object of the present invention is to provide a device of the character described in the valve stem of the tire may be left free from attachments and encumbrances while the pressure gauge is operably attached to the wheel.

Another object of the present invention is to provide a device of the character described in which tire air pressure is communicated to the gauge member via a conduit permanently built into the wheel.

Another object is to provide a device of the character described wherein the air pressure conduit is constructed into a "spoke" of the wheel.

Another object is to provide a device of the character described wherein the tire's valve stem is located on the wheel rim approximately diametrically opposite the air pressure conduit.

Another object of the present invention is to provide a device of the character described in which the pressure indicating device is mounted at the center of the wheel without the use of bolts and nuts or other loose or losable fastening hardware.

Further objects and advantages of this invention will become apparent from a consideration of the drawings and ensuing description thereof.

DRAWINGS

REFERENCE NUMERALS IN DRAWINGS

Figure 1:
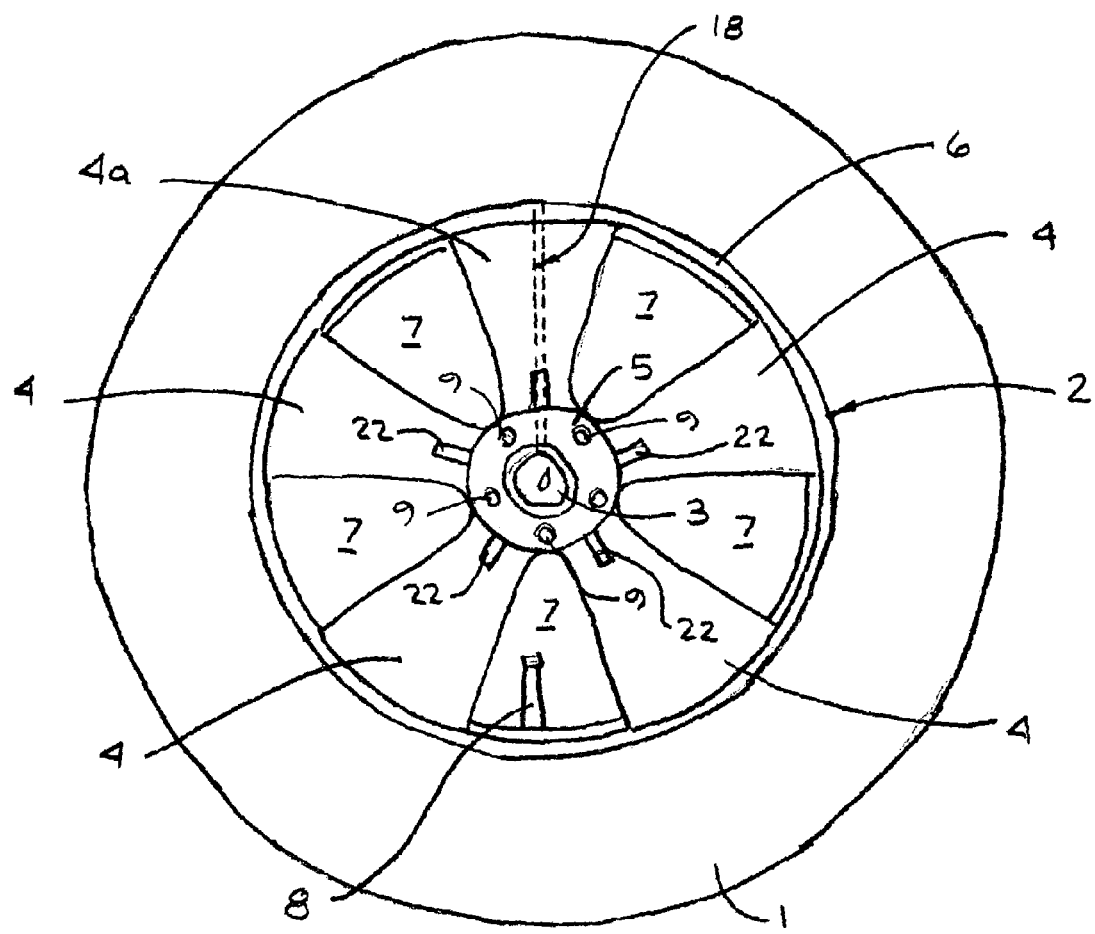
FIG. 1 is a side elevation of a pneumatic tire employing the present invention.
Figure 2:
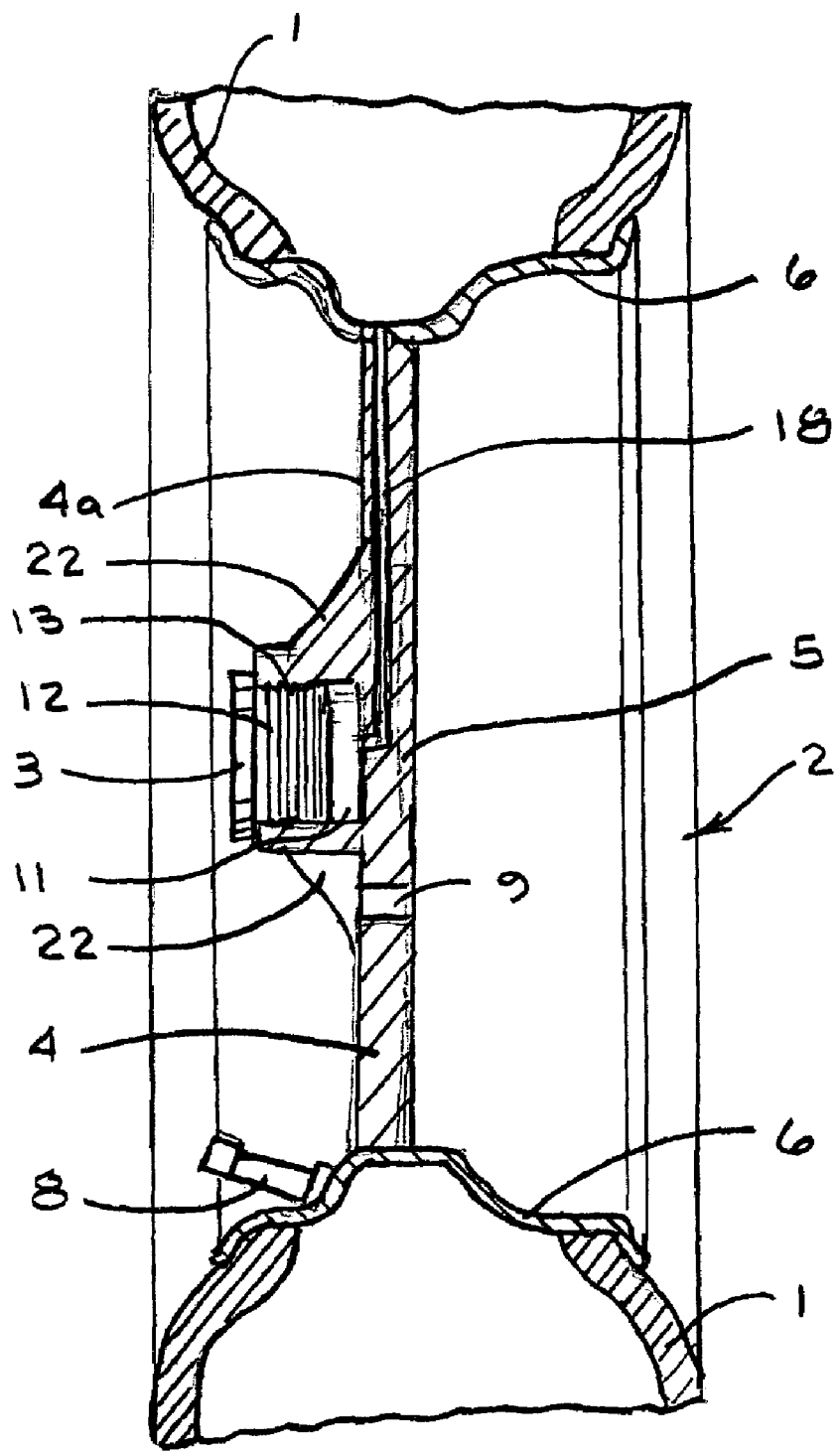
FIG. 2 is a diametrical cross-section of a tire and wheel assembly embodying the present invention.

1 Tire
2 Wheel
3 Gauge
4 Spokes
4a Spoke with conduit
5 Hub
6 Rim
7 Open space (between spokes)
8 Valve Stem
9 Hole (lug bolt)
10 Housing, gauge
10a Bottom of Housing
10b Side of Housing
11 Recess in Hub
11a Bottom of Recess
11b Wall of Recess
12 Male Thread
13 Female Thread
14 Gauge Shoulder
15 Recess Shoulder
16 O-Ring
17 Gauge Opening
18 Conduit
19 Cavity
20 Boss
21 Face of Gauge
22 Gusset

DESCRIPTION

The present invention is a pressure indicating gauge (3) that is adapted to be mounted at the center of a wheel (2) of a pneumatic tire (1) such as may be used on an automobile.

The wheel (2) has a number of spokes (4) that support a central hub (5). As used herein, the term "spoke" 4 refers to one of a plurality of structural members, each of which extends substantially radially from the rim (6) of the wheel (2) to the wheel's central hub (5), and between each adjacent pair of which there is a substantially open space (7).

A valve stem (8) of common construction is provided in the wheel rim (6). The valve stem (8) provides means for adding air, under pressure, into the interior of the tire (1). The tire (1) is attached to the rim (6) in the usual manner.

Holes (9) are provided at the hub (5) of the wheel (2) for attachment of the wheel-and-tire to an automobile by common lug nuts and studs (not shown)

In the preferred embodiment of the invention, the gauge (3) has a circular housing (10) that is adapted to fit into an outwardly opening circular recess (11) in the hub (5) of the wheel (2). In the preferred embodiment of the invention, the wall (11a) of the recess (11) is solid and a continuous, and preferably is either cast, pressed, molded, machined or otherwise manufactured out of the same material and structure as the wheel's spokes (4).

The centerlines of the gauge housing 10, the hub recess 11 and the wheel all coincide with each other.

In the preferred embodiment of the invention, male threads (12) are provided on the exterior side (10a) of the gauge housing (10), and mating female threads (13) are provided on the interior wall of the hub recess (11).

In operation, the gauge (3) is screwed tightly into the hub recess (11), forming an air-tight seal with between the gauge housing (10) and the interior wall (11a) of the hub recess (11). The face (21) of the gauge (3) is clearly visible, and therefore can be easily read, from a distance beyond the wheel.

In the preferred embodiment of the invention, an O-ring (16) is positioned between continuous shoulders (14) and (15) around the circumference of the gauge housing (10) and the interior of the hub recess (11), respectively, to facilitate an air-tight seal between the gauge housing (10) and the hub recess (11). Other common devices can be alternatively used, in other embodiments of the invention, to facilitate an air-tight seal between the gauge (3) and the hub recess (11), including snap-fit, spring-lock, and twist-lock fasteners.

Figure 3:
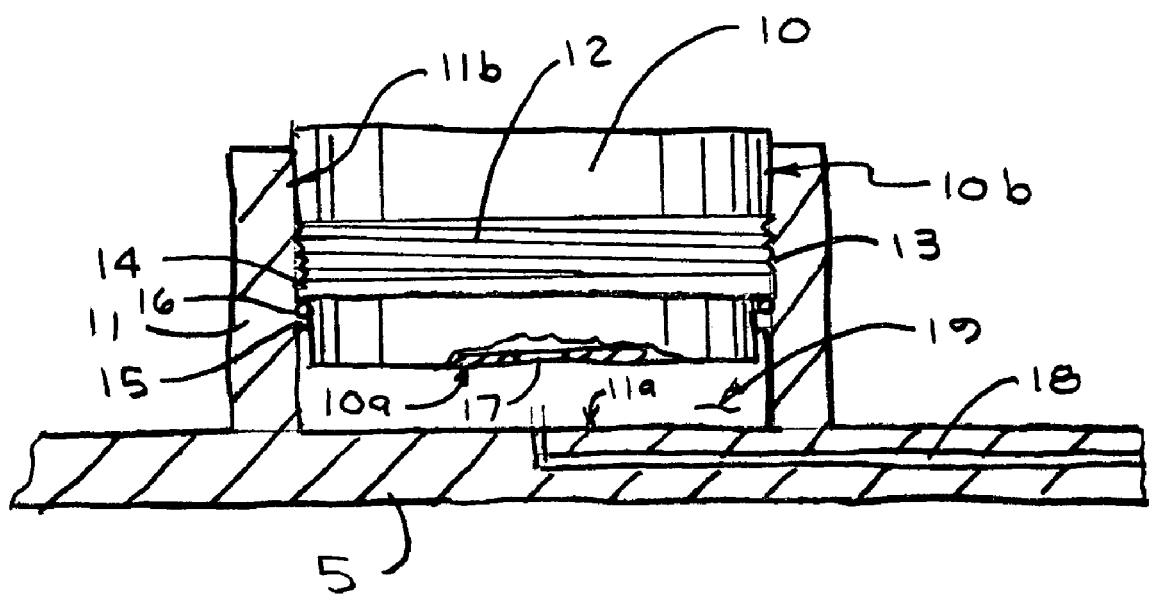
FIG. 3 is a partial medial cross-section showing details of construction of a the gauge housing and hub recess of the preferred embodiment of the present invention.

The hub (5) of the wheel (2) is supported from the rim (6) by a plurality of spokes (4). One spoke (4a) is provided with a small diameter enclosed channel, hereinafter "conduit" (18) which extends from the rim (6) to the hub (5). The conduit (18) extends at one end through the rim (6), thereby exposing the conduit (18) to the air inside of the tire's (1) interior. At its opposite end, the conduit (18) travels inside the spoke (4a) and inside of the hub (5), and opening into hub recess (11), as shown in FIG. 3. It will be understood that, in accordance with the above described construction, air pressure inside of the tire's (1) interior is communicated directly to the hub recess (11) via the conduit (18).

An opening (17) in the gauge housing (10) exposes the gauge's (3) internal mechanism (not shown) to the air pressure of the tire (1) via conduit (18). In the preferred embodiment of the invention, the conduit (18) opens into the bottom (11b) of the hub recess (11), forming a pressurized cavity (19) between the bottom (10a) of the gauge housing (10) and the bottom (11b) of the hub recess (11).

Figure 5:
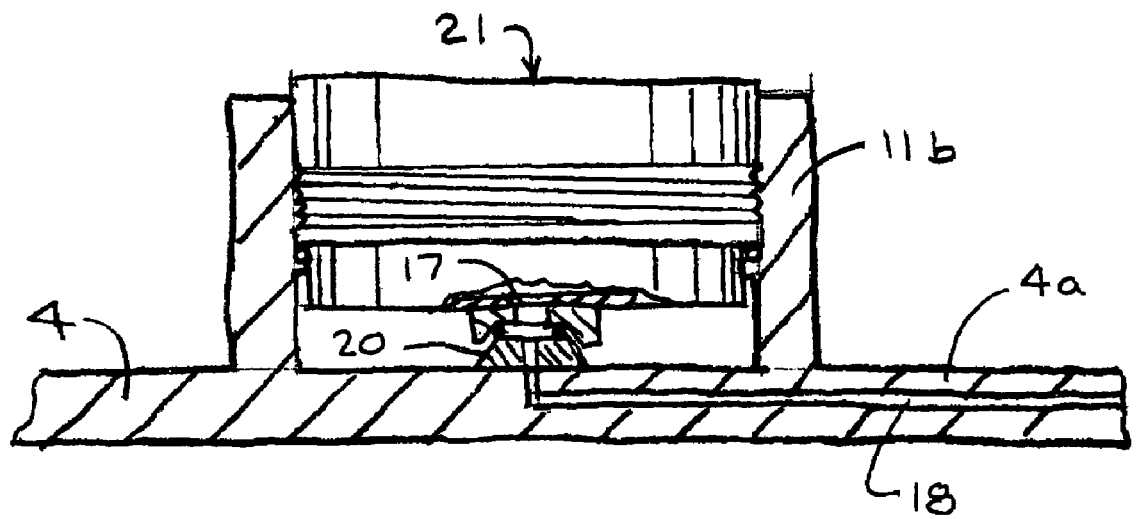

In one modification of the invention, as illustrated in FIG. 5, conduit (18) passes through a boss (20) in the bottom (11b). In this modification of the invention, the boss (20) forms an air tight seal with the bottom (10a) of the gauge housing (10) at the gauge opening (16). In this modification of the invention, an air-tight seal is not necessary between the side (10b) of the gauge housing and the wall (11a) of the recess.

Figure 4:
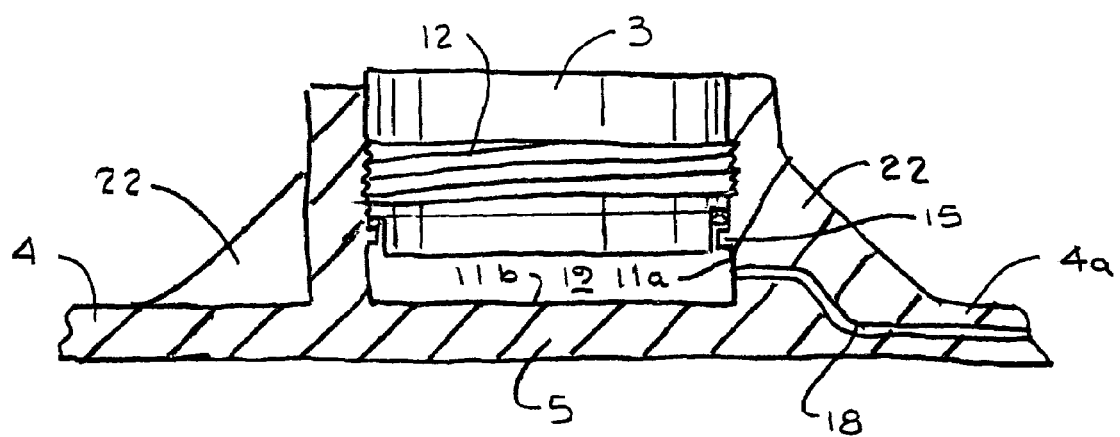
FIG. 4 is a partial medial cross-section showing details of construction of the gauge housing and hub recess of a modified embodiment of the present invention; and, FIG. 5 is a partial medial cross-section showing details of construction of the gauge housing and hub recess of a modified embodiment of the present invention

In another modification of the invention, as shown in FIG. 4, the conduit (18) may, instead, open into the hub recess (11) through the wall (11a) of the recess, between the shoulder (15) of the recess (11) and the bottom (11b) of the recess. In this embodiment of the invention, an air-tight seal must be maintained between the gauge housing (10) and the recess wall (11a) outboard of the conduit's penetration through the recess wall (11a) into the recess cavity (19). Gussets (22) may be provided between the spokes (4) and the wall (11b) of the hub to provide strength to the assembly and to provide a convenient path for the conduit (18) from the spoke (4a) to the wall (11b) of the hub recess (11).

In the preferred embodiment of the invention, the air conduit (18) is molded or cast into the interior of the spoke (4a) structure, and the exterior surface of the spoke (4a) does not reveal (i.e., there are no surface discontinuities attributable to) the existence of the conduit (18).

Also, in the preferred embodiment of the invention, the cross-sectional area of the air conduit (18) through the spoke (4a) is substantially uniform and is small relative to the average gross cross-sectional area of the spoke (4a), itself. In the preferred embodiment of the invention, the maximum cross-sectional area of the conduit (18) inside of the spoke (4a) is one square millimeter, and the average gross cross-sectional area of the spoke (4a) is at least ten square millimeters.

The conduit (18) is preferably in a spoke (4a) that is, or nearly is, diametrically across the rim (6) from the valve stem (8).

It will be understood by those skilled in the art that, in operation, air pressure from within the tire (1) is communicated to the gauge (3) via conduit (18). The pressure of the air inside of the tire (1) is displayed on the face (21) of the gauge, which is readable whenever the automobile (and wheel) is not moving.

While the above description contains many specificities, these should not be construed as limitations on the scope of the invention, but rather as an exemplification of one preferred embodiment thereof. Many variations are possible, for example:

The face (21) of the gauge (3) may be outboard of the wall (11a) of the recess, as shown in the figures, or may, alternatively be flush with or recessed within the hub recess (11);

the air pressure gauge (3) may have either a digital or dial face;

the face (21) of the pressure gauge (3) may indicate either absolute pressure, gauge pressure, or simply indicate whether the pressure is above or below a pre-selected range of pressures;

the conduit (18) may have a cross-sectional area greater than one millimeter;

the conduit (18) may be located in a spoke (4a) that is located less than 180 degrees around the rim (6) from the valve stem (8);

the "spokes" (4) of the wheel, may including webbing material that joins adjacent "spokes" to each other;

individual conduits (18) may be located in multiple "spokes", thereby making it possible to manufacture all "spokes" identically, allowing redundancy in the event that one or more conduits becomes blocked for any reason, and allowing the average cross-sectional area of each conduit to be very small, (i.e., on the order of less than a half millimeter in diameter);

the wall (11a) of the recess may be provided with a male thread adapted to engage female threads of a dust cap (not shown) for protecting the face (21) of the gauge; and, p1 a radio frequency (RF) transmitter may be connected to the gauge, (for example, inside the gauge housing), for transmitting pressure-indicative information to a remote RF receive (for example, located at the dashboard of the automobile), for continuous and remote monitoring of the pressure status of the tire.

Accordingly, the scope of the invention should be determined not by the embodiment(s) illustrated, but by the appended claims and their legal equivalents.

What is claimed is:

1. A wheel-mounted air pressure measuring device, comprising:
   a wheel assembly comprising a rigid wheel member (2) and a pneumatic tire (1) mounted thereto;
   said rigid wheel member (1) comprising a centrally located hub member (5), a wheel rim member (6), and a plurality of wheel spoke members (4);
   wherein each of said plurality of wheel spoke members (4) extends from said centrally located hub member (5) to said wheel rim member (6);
   and wherein each of said plurality of wheel spoke members (4) is rigidly attached to said centrally located hub member (5) and is rigidly attached to said wheel rim member (6);
   and further comprising valve means (8) for selectively introducing pressurized air into, and containing pressurized air within, an interior cavity of said pneumatic tire (1);
   wherein said valve means (8) comprises a valve stem disposed at a first location on said wheel rim member (6);
   and further comprising a pressure gauge (3) disposed within a recess (11) in said hub member (5);
   and a hollow conduit (18) inside a first wheel spoke (4a) of said plurality of wheel spoke members (4), said hollow conduit (18) having a first end and a second end, wherein said first end of said hollow conduit (18) opens into said recess (11) in said hub member (5), and wherein said second end of said hollow conduit (18) extends through said wheel rim member (6) into said interior cavity of said pneumatic tire (1);
   said pressure gauge (3) comprising a gauge housing (10) and an opening (17) in said gauge housing;
   and further comprising means (13) for securing said gauge (3) within said recess (11);
   and means (16) for pneumatically sealing said gauge housing (10) within said recess (11).

2. The device according to claim 1, wherein each of said spoke members (4) extends substantially radial from said hub member (5) to said wheel rim member (6),
   and wherein there is a substantially open space (7) between each adjacent pair of said plurality of spoke members (4).

3. The device according to claim 2, wherein said first wheel spoke (4a) is rigidly attached to said wheel rim member (6) at a second location spaced apart from said first location.

4. The device according to claim 3, wherein a wall (11b) of said recess (11) in said wheel hub member (5) is constructed from the same material as a material of construction of said plurality of spoke members (4).

5. The device according to claim 4, wherein said means for pneumatically sealing said gauge housing (10) within said recess (11) comprises:
   an O-ring (16);
   a continuous shoulder (15) disposed on said wall (11) of said recess (11);
   and, a continuous shoulder (14) on said gauge housing (10).

6. The device according to claim 5, wherein said means (13) for securing said gauge (3) within said recess (11) comprises:
   male threads (12) on said gauge housing (10);
   and female threads (13) on said wall (11b) of said recess (11).

7. The device according to claim 6, wherein said hollow conduit (18) comprises a continuous channel embedded within said first wheel spoke (4a), and wherein an exterior surface of said first wheel spoke (4a) is substantially identical to an exterior surface of another wheel spoke of said plurality of wheel spokes (4).

8. The device according to claim 7, wherein the cross-sectional area of said hollow conduit (18) is substantially uniform within said first wheel spoke (4a).

9. The device according to claim 8, wherein the average gross cross-sectional area of said first wheel spoke (4*a*) between said wheel hub member (5) and said wheel rim (6) is at least ten times as great as the maximum cross-sectional area of said hollow conduit 18 within said first wheel spoke (4*a*).

10. The device according to claim 9, wherein said first location on said wheel rim member (6) is approximately diametrically opposite said second location on said wheel rim member.

* * * * *